US012680983B2

(12) United States Patent
Rombach et al.

(10) Patent No.: US 12,680,983 B2
(45) Date of Patent: Jul. 14, 2026

(54) DETECTION OF SENSOR PASSIVATION FAILURE

(71) Applicant: Qorvo US, Inc., Greensboro, NC (US)

(72) Inventors: Cody Rombach, Medford, OR (US);
Matthew Wasilik, Plano, TX (US);
Buu Quoc Diep, Murphy, TX (US)

(73) Assignee: Qorvo US, Inc., Greensboro, NC (US)

( * ) Notice: Subject to any disclaimer, the term of this
patent is extended or adjusted under 35
U.S.C. 154(b) by 298 days.

(21) Appl. No.: 18/573,593

(22) PCT Filed: Jun. 29, 2021

(86) PCT No.: PCT/US2021/039604
§ 371 (c)(1),
(2) Date: Dec. 22, 2023

(87) PCT Pub. No.: WO2023/277882
PCT Pub. Date: Jan. 5, 2023

(65) Prior Publication Data
US 2024/0353376 A1     Oct. 24, 2024

(51) Int. Cl.
*G01N 29/30*        (2006.01)
*G01N 29/02*        (2006.01)

(52) U.S. Cl.
CPC ........... *G01N 29/30* (2013.01); *G01N 29/022*
(2013.01); *G01N 2291/0255* (2013.01); *G01N*
*2291/0426* (2013.01)

(58) Field of Classification Search
CPC ...... G01N 29/00; G01N 29/02; G01N 29/022;
G01N 29/30; G01N 2291/0255; G01N
2291/0426
See application file for complete search history.

(56) References Cited

U.S. PATENT DOCUMENTS

| | | | |
|---|---|---|---|
| 4,754,646 A | 7/1988 | EerNisse et al. | |
| 6,975,944 B1 | 12/2005 | Zenhausern | |
| 9,069,031 B2 | 6/2015 | Guedes et al. | |

(Continued)

FOREIGN PATENT DOCUMENTS

| | | | | | |
|---|---|---|---|---|---|
| CN | 115250099 A | * | 10/2022 | ............... | H03H 9/02 |
| DE | 10155927 A1 | * | 6/2003 | ............. | H03H 9/174 |

OTHER PUBLICATIONS

Machine Translation of CN-115250099-A (Year: 2021).*

(Continued)

*Primary Examiner* — Nguyen Q. Ha
(74) *Attorney, Agent, or Firm* — Fish & Richardson P.C.

(57)            ABSTRACT

Embodiments described herein involve a test structure for a sensor, comprising a substrate being part of the sensor and a moat structure disposed on the substrate. The sensor comprises a resonating structure comprising a piezoelectric layer having an active region. A passivation layer overlays the resonating structure including the active region. The moat structure is configured to at least partially surround the active region in plan view. An electrode is disposed on the substrate and comprises an electrode path. The electrode path crosses the moat structure at least one time in plan view. The moat structure at each moat crossing is configured to cause a change in electrical resistance of the electrode if there is passivation failure of the passivation layer at the moat crossing.

18 Claims, 8 Drawing Sheets

(56)             References Cited

U.S. PATENT DOCUMENTS

| | | | |
|---|---|---|---|
| 9,581,593 B2 | 2/2017 | Ibbotson et al. | |
| 2004/0021403 A1 | 2/2004 | Ayazi et al. | |
| 2010/0068831 A1* | 3/2010 | Barber ................... | H03H 9/175 |
| | | | 257/E21.531 |
| 2013/0075794 A1 | 3/2013 | Bradley et al. | |

OTHER PUBLICATIONS

Machine Translation of DE-10155927-A1 (Year: 2001).*
International Search Report and Written Opinion mailed Oct. 21,
2021, in International Application PCT/US2021/039604, 8 pages.

* cited by examiner

DETECTION OF SENSOR PASSIVATION FAILURE

CROSS-REFERENCE TO RELATED APPLICATION

The present application is a U.S. National Stage patent application of International Patent Application No. PCT/US2021/039604, filed on Jun. 29, 2021, the benefit of which is claimed and the disclosure of which is incorporated herein by reference in its entirety.

TECHNICAL FIELD

The present disclosure relates to biosensors for biosensing or biochemical sensing applications.

BACKGROUND

Piezoelectric devices such as thin film bulk acoustic wave (BAW) resonators and similar technologies like quartz crystal microbalances (QCM) have been employed as mass detectors for some time. One application of piezoelectric resonators is in detecting very small quantities of materials. A piezoelectric resonator is typically constructed as a thin, planar layer of crystalline or polycrystalline piezoelectric material sandwiched between two electrode layers. When used as a sensor, the resonator is exposed to the material being detected to allow the material to bind on a surface of the resonator.

The material to be detected is often an analyte. A binding partner (e.g., an antibody, etc.) that selectively binds the analyte may be immobilized relative to a surface of the resonator. When the analyte is contacted with the surface of the resonator, the mass on the surface increases. The changed mass results in changes to the resonance phase, frequency, etc., of the resonator.

One conventional way of detecting the amount of the material bound on the surface of a sensing resonator is to operate the resonator at its resonant frequency in an oscillator circuit. As the material being detected binds on the resonator surface, the oscillation frequency of the resonator is reduced. The change in the oscillation frequency of the resonator, presumably caused by the binding of the material on the resonator surface, is measured and used to calculate the amount of the material bound on the resonator or the rate at which the material accumulates on the resonator surface.

In the case of a piezoelectric crystal resonator, an acoustic wave may embody a BAW propagating through the interior (or "bulk") of a substrate, or a surface acoustic wave (SAW) propagating on the surface of the substrate. SAW devices involve transduction of acoustic waves (commonly including two-dimensional Rayleigh waves) utilizing interdigital transducers along the surface of a piezoelectric material, with the waves being confined to a penetration depth of about one wavelength. BAW devices typically involve transduction of an acoustic wave using electrodes arranged on opposing top and bottom surfaces of a piezoelectric material. In a BAW device, three wave modes can propagate, namely, one longitudinal mode (embodying longitudinal waves, also called compressional/extensional waves, and two shear modes (embodying shear waves, also called transverse waves), with longitudinal and shear modes respectively identifying vibrations where particle motion is parallel to or perpendicular to the direction of wave propagation. The longitudinal mode is characterized by compression and elongation in the direction of the propagation, whereas the shear modes consist of motion perpendicular to the direction of propagation with no local change of volume. Longitudinal and shear modes propagate at different velocities. In practice, these modes are not necessarily pure modes, as the particle vibration, or polarization, is neither purely parallel nor purely perpendicular to the propagation direction. The propagation characteristics of the respective modes depend on the material properties and propagation direction respective to the crystal axis orientations. Since shear waves exhibit a very low penetration depth into a liquid, a device with pure or predominant shear modes can operate in liquids without significant radiation losses (in contrast with longitudinal waves, which can be radiated in liquid and exhibit significant propagation losses). The ability to create shear displacements is beneficial for operation of acoustic wave devices with fluids (e.g., liquids) because shear waves do not impart significant energy into fluids.

Certain piezoelectric thin films are capable of exciting both longitudinal and shear mode resonance, such as hexagonal crystal structure piezoelectric materials including (but not limited to) aluminum nitride [AlN] and zinc oxide [ZnO]. To excite a wave including a shear mode using a piezoelectric material arranged between electrodes, a polarization axis in a piezoelectric thin film must generally be non-perpendicular to (e.g., tilted relative to) the film plane. In biological sensing applications involving liquid media, the shear component of the resonator is used. In such applications, piezoelectric material may be grown with a c-axis orientation distribution that is non-perpendicular relative to a face of an underlying substrate to enable a BAW resonator structure to exhibit a dominant shear response upon application of an alternating current signal across electrodes thereof. Conversely, a piezoelectric material grown with a c-axis orientation that is perpendicular relative to a face of an underlying substrate will enable a BAW resonator structure to exhibit a dominant longitudinal response upon application of an alternating current signal across electrodes thereof.

SUMMARY

Embodiments described herein involve a test structure for a sensor, comprising a substrate being part of the sensor and a moat structure disposed on the substrate. The sensor comprises a resonating structure comprising a piezoelectric layer having an active region. A passivation layer overlays the resonating structure including the active region. The moat structure is configured to at least partially surround the active region in plan view. An electrode is disposed on the substrate and comprises an electrode path. The electrode path crosses the moat structure at least one time in plan view. The moat structure at each moat crossing is configured to cause a change in electrical resistance of the electrode if there is passivation failure of the passivation layer at the moat crossing.

Embodiments described herein involve a system, comprising a sensor. The sensor comprises a substrate and a resonating structure. The resonating structure is disposed proximate the substrate and comprises at least one piezoelectric layer. The resonating structure has an active region. A passivation layer overlays the resonating structure including the active region. A moat structure is disposed on the substrate and at least partially surrounds the active region of the resonating structure in plan view. An electrode is disposed on the substrate and comprises an electrode path. The electrode path crosses the moat structure at least one time in plan view. The moat structure at each moat crossing is configured to cause a change in electrical resistance of the electrode if there is passivation failure of the passivation layer at the moat crossing. A detector is configured to detect the change in electrical resistance. An analyzer is configured to determine passivation failure of the passivation layer based on the detected change in electrical resistance.

Figure 1:
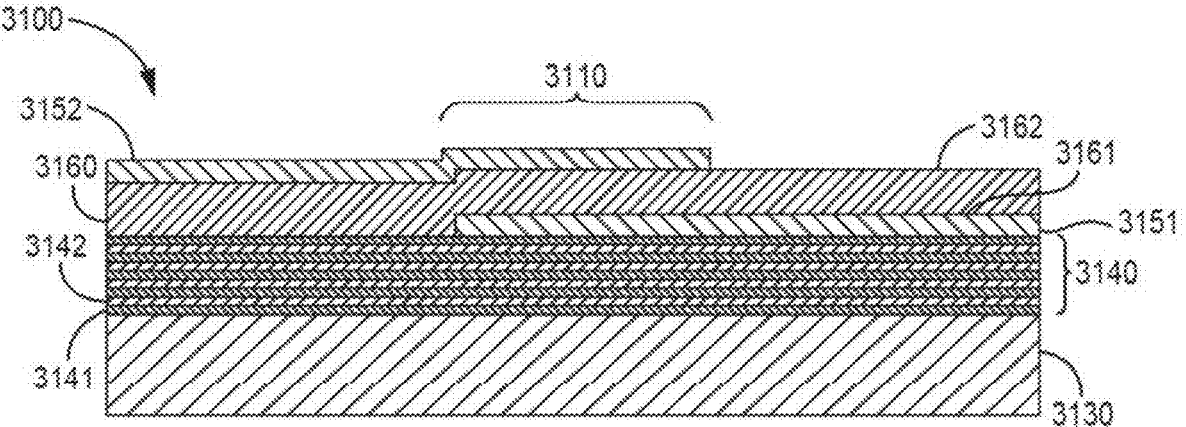
FIG. 1 is a schematic cross-sectional view of a portion of a bulk acoustic wave (BAW) Microelectromechanical system (MEMS) resonator structure useable with embodiments disclosed herein.

The schematic drawings are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

This disclosure generally relates to, among other things, methods, devices, sensors, and systems for detecting an analyte. The methods, devices, sensors, and systems use a thin film bulk acoustic wave (BAW) resonator that measures a change in frequency or phase of the resonator caused by the binding of the analyte on a surface of the resonator. An input electrical signal having a phase and having a frequency within a resonance band of the piezoelectric resonator is coupled to and transmitted through the resonator to generate an output electrical signal which is frequency-shifted or phase-shifted from the input signal due to binding, deposition, etc. of material being detected on the resonator surface. The output electrical signal received from the piezoelectric resonator is analyzed to determine the change in frequency or phase caused by the binding of analyte on the resonator surface. The measured change in frequency or phase provides quantitative information regarding the analyte (or tag-linked analyte molecule) bound to the resonator surface.

The sensors disclosed herein may include at least one thin film resonator sensor, such as a thin film bulk acoustic wave (BAW) resonator sensor. A BAW sensor includes a piezoelectric layer, or piezoelectric substrate, and input and output transducers. BAW sensors are small sensors, making the technology suitable for use in handheld devices. Accordingly, a handheld device for detecting target analytes comprising a sensor described herein is contemplated.

According to embodiments described herein, the resonator typically includes a planar layer of piezoelectric material bounded on opposite sides by two respective metal layers that form the electrodes of the resonator. The two surfaces of the resonator are free to undergo vibrational movement when the resonator is driven by a signal within the resonance band of the resonator. When the resonator is used as a sensor, at least one of its surfaces is adapted to provide binding sites for the material being detected. The binding of the material on the surface of the resonator alters the resonant characteristics of the resonator, and the changes in the resonant characteristics are detected and interpreted to provide quantitative information regarding the material being detected.

By way of example, such quantitative information may be obtained by detecting a change in the insertion or reflection coefficient phase shift of the resonator caused by the binding of the material being detected on the surface of the resonator. Such sensors differ from those that operate the resonator as an oscillator and monitor changes in the oscillation frequency. Rather such sensors insert the resonator in the path of a signal of a pre-selected frequency and monitor the variation of the insertion or reflection coefficient phase shift caused by the binding of the material being detected on the resonator surface. Of course, sensors that monitor changes in oscillation frequency may also be employed in accordance with the methods described herein.

FIG. 1 is a schematic cross-sectional view of a portion of a bulk acoustic wave (BAW) Microelectromechanical system (MEMS) resonator structure 3100 useable with embodiments disclosed herein. The resonator structure 3100 includes a substrate 3130 (e.g., typically silicon or another semiconductor material), an acoustic reflector 3140 arranged over the substrate 3130, a piezoelectric material 3160, and bottom and top side electrodes 3151, 3152. Electrodes may be formed of any suitable material, such as aluminum, tungsten, gold, titanium, molybdenum, or the like. Electrodes may be deposited by vapor deposition or may be formed by any other suitable process. The bottom side electrode 3151 is arranged along a portion of a lower surface 3161 of the piezoelectric material 3160 (between the acoustic reflector 3140 and the piezoelectric material 3160), and the top side electrode 3152 is arranged along a portion of an upper surface 3162 of the piezoelectric material 3160. An area in which the piezoelectric material 3160 is arranged between overlapping portions of the top side electrode 3152 and the bottom side electrode 3151 is considered an active region 3110 of the resonator device 3100 to which a biomolecule is preferably applied. The acoustic reflector 3140 serves to reflect acoustic waves and therefore reduce or avoid their dissipation in the substrate 3130. In certain embodiments, the acoustic reflector 3140 includes alternating thin layers 3141, 3142 of materials (e.g., silicon oxicarbide [SiOC], silicon nitride [$Si_3N_4$], silicon dioxide [$SiO_2$], aluminum nitride [AlN], tungsten [W], and molybdenum [Mo]) having different acoustic impedance values, optionally embodied in a quarter-wave Bragg mirror, deposited over the substrate 3130. In certain embodiments, other types of acoustic reflectors may be used. Steps for forming the resonator device 3100 may include depositing the acoustic reflector 3140 over the substrate 3130, followed by deposition of the bottom side electrode 3151, followed by growth (e.g., via sputtering or other appropriate methods) of the piezoelectric material 3160, followed by deposition of the top side electrode 3152.

In certain embodiments, the piezoelectric material 3160 comprises a hexagonal crystal structure piezoelectric material (e.g., aluminum nitride or zinc oxide) that includes a c-axis having an orientation distribution that is predominantly non-parallel (and may also be non-perpendicular to) to normal of a face of the substrate 3130. Under appropriate conditions, presence of a c-axis having an orientation distribution that is predominantly non-parallel to normal of a face of a substrate enables a BAW resonator structure to be configured to exhibit a dominant shear response upon application of an alternating current signal across a distal electrode and a proximal electrode thereof (e.g., as may be desirable in the context of a BAW resonator structure providing sensing utility).

Figure 2A:
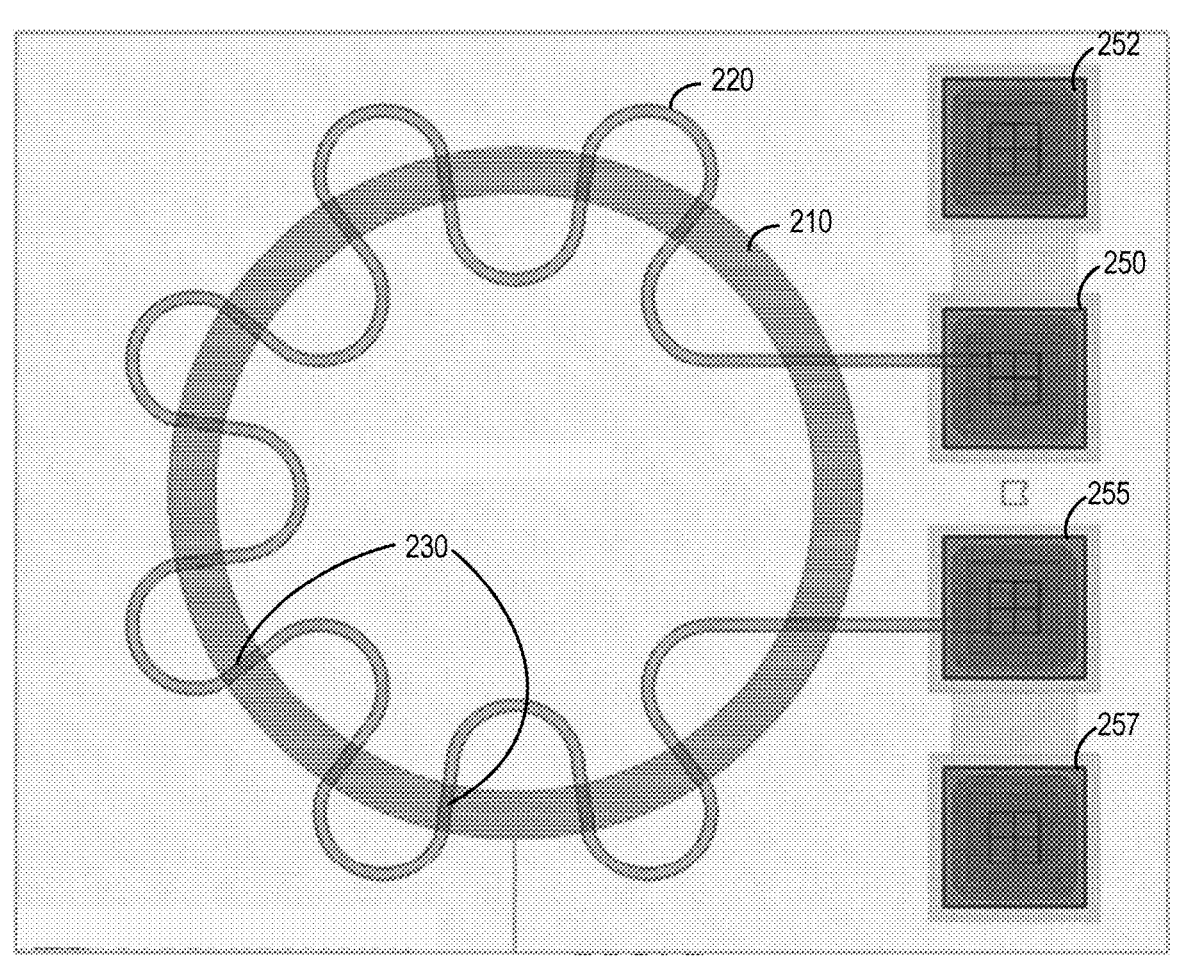
FIGS. 2A and 2B show an example of a test structure for detecting passivation failure in accordance with embodiments described herein.

The bulk acoustic wave MEMS resonator structure 3100 shown in FIG. 2A lacks any layers (e.g., including functionalization material) overlying the active region 3110 that may permit the resonator device 3100 to be used as a biochemical sensor. If desired, at least portions of the resonator device 3100 shown in FIG. 1 (e.g., including the active region 3110) may be overlaid with various layers, such as one or more of: a hermeticity layer, an interface layer, a self-assembled monolayer (SAM), a passivation layer and/or a functionalization material layer (which may include specific binding material or non-specific binding material). A passivation layer may function as a moisture barrier layer for example. Illustrative passivation layers can include silicon nitride, and aluminum oxide (e.g., ALD deposited AlO) for example. Passivation layers may provide moisture barrier properties that could serve to protect the device.

Embodiments described herein involve a test structure designed to detect the presence of bottom electrode attack, due to passivation failure. In prior art, this may conventionally be done with an acid dip test, for example. Detection of acid attack may be accomplished by measuring an increased resistance of the electrode path during electrical test post acid dip. For example the system may conventionally be submersed in a phosphoric-acetic-nitric acid mix to see if underlying metal structure is not protected by the passivation.

However, in general, some inventive biosensor designs disclosed herein may include a moat that at least partially surrounds an active region of the resonator in plan view. According to various configurations, the moat may be etched. In the moat region bottom electrode (BE) attack may be susceptible during final use if the passivation fails. Embodiments described herein involve systems and methods for testing the integrity of the passivation at a wafer level. Therefore, instead of performing an electrical test in a post acid dip of an acid dip test of a nearly complete biosensor, an electrical test may be performed to detect the passivation failure at the wafer level. The proposed test structure may be used when visual inspection is not possible and/or not practical.

The test structure uses a BE path that meanders across the moat structure providing multiple opportunities to detect metal attack of the thin BE lines as they cross the moat structure. Each crossing BE line which is attacked may change the resistance of the BE line. For example, each crossing which is attacked may increase the resistance of the BE line. In some cases, each crossing substantially opens the resistance when the BE line is attacked. This allows for detection during an electrical test without visual inspection.

Figure 2B:
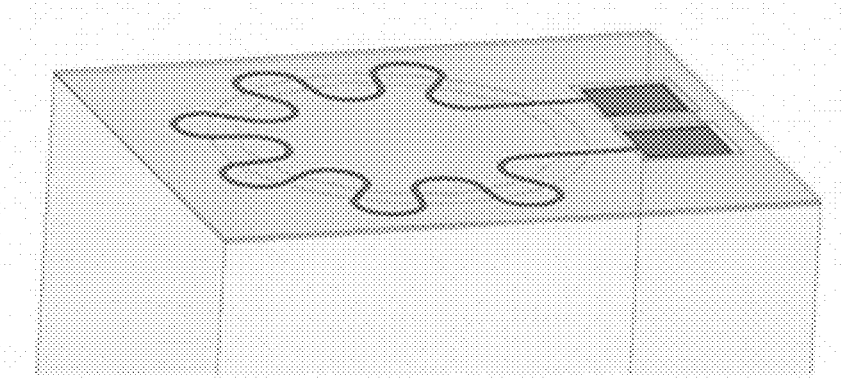

FIGS. 2A and 2B show an example of a test structure for detecting passivation failure in accordance with embodiments described herein. A BE path 220 has a plurality of intersections 230 with a moat structure 210. In this example, the BE path 220 crosses 230 the moat structure 12 times. Therefore, the system shown in FIGS. 2A-2B provides 12 opportunities to detect BE attack due to passivation failure. If adequate passivation of the BE exists, the measured resistance of the electrode path may be in a range of about $50\Omega$ to about $80\Omega$. If the measured resistance is outside of this range, it may be determined that the passivation has failed at one or more of the moat crossings 230. In some cases, if the calculated resistance of the electrode path 220 is more than a predetermined threshold beyond an estimated resistance (e.g., $65\Omega$), it may be determined that the passivation has failed. DC probe pads 250, 255 may be used to enable both RF and DC probing. According to various embodiments, a four-point probe DC resistance test may be used with the four pad 250, 255, 252, 257 configuration shown here. In some cases, the two central pads 250, 255 can serve as signal-ground for an RF probe.

Figure 3A:
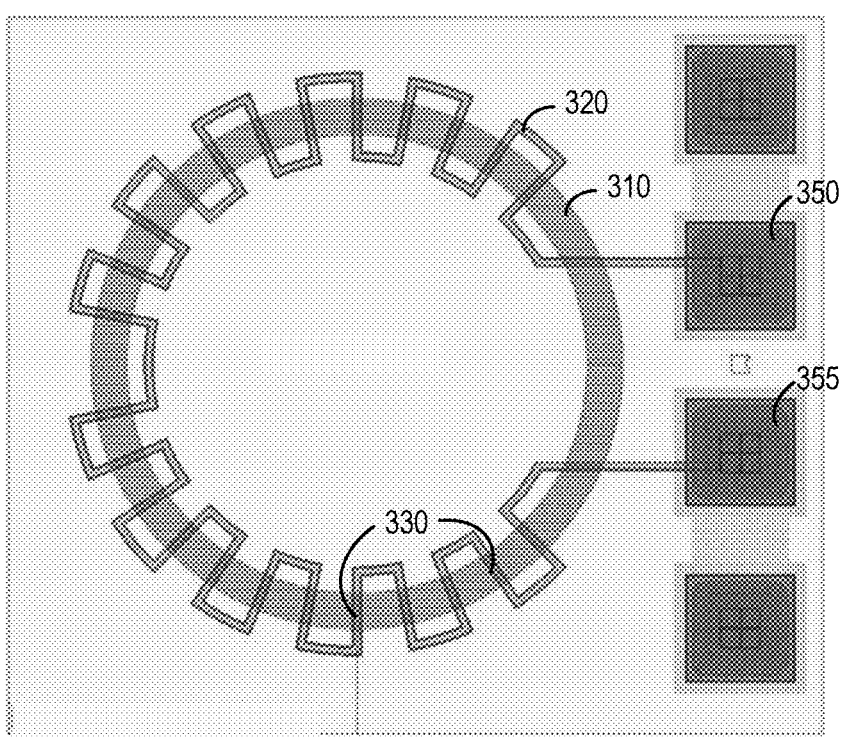
FIGS. 3A and 3B show another example of a test structure for detecting passivation failure in accordance with embodiments described herein.
Figure 3B:
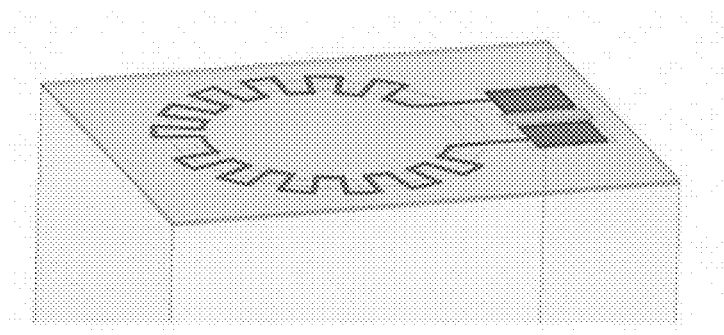
Figure 3C:
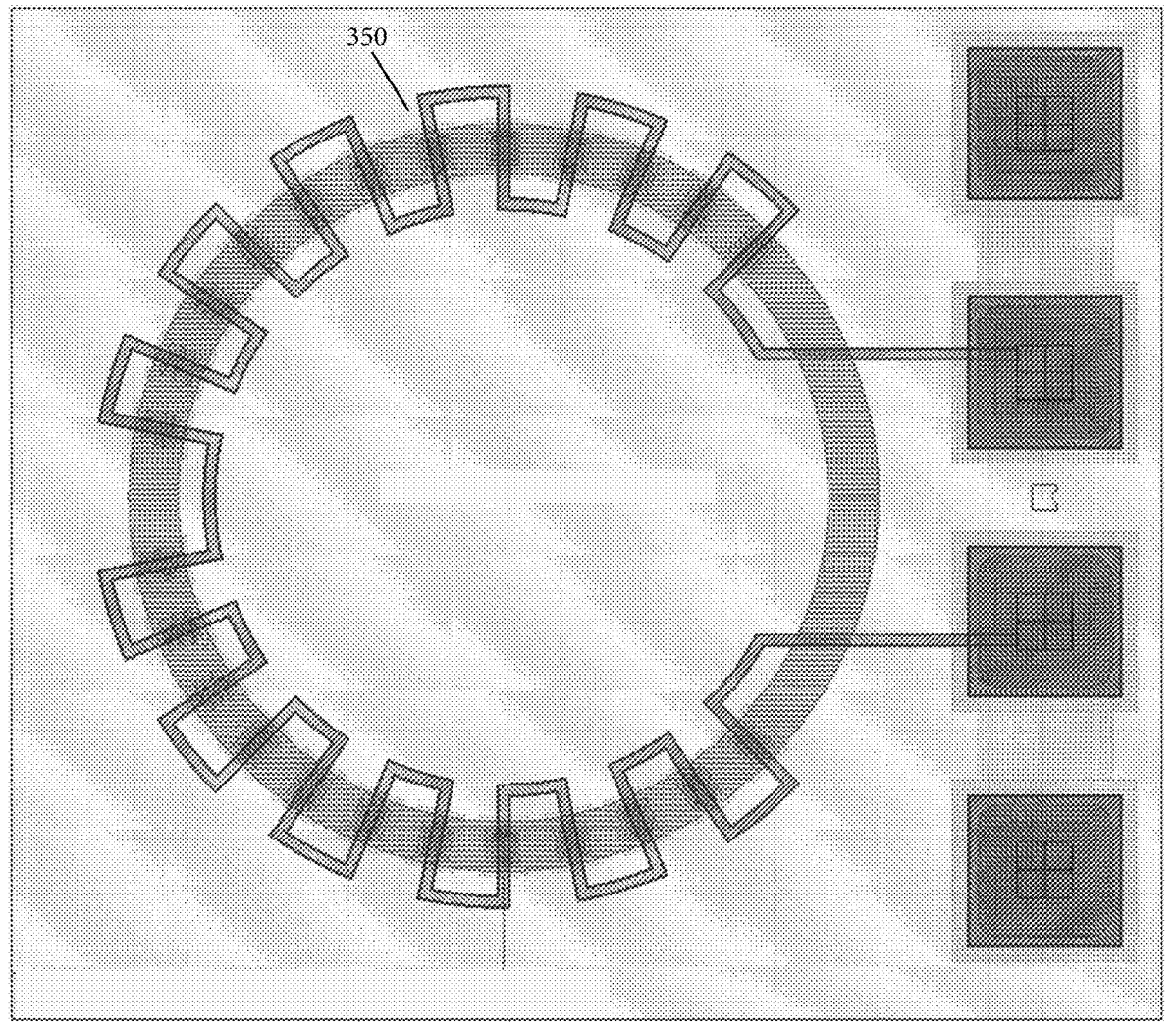
FIG. 3C shows the moat of FIGS. 3A and 3B with added layers at the moat crossings to simulate the moat changes at the crossings in accordance with embodiments described herein.
Figure 3D:
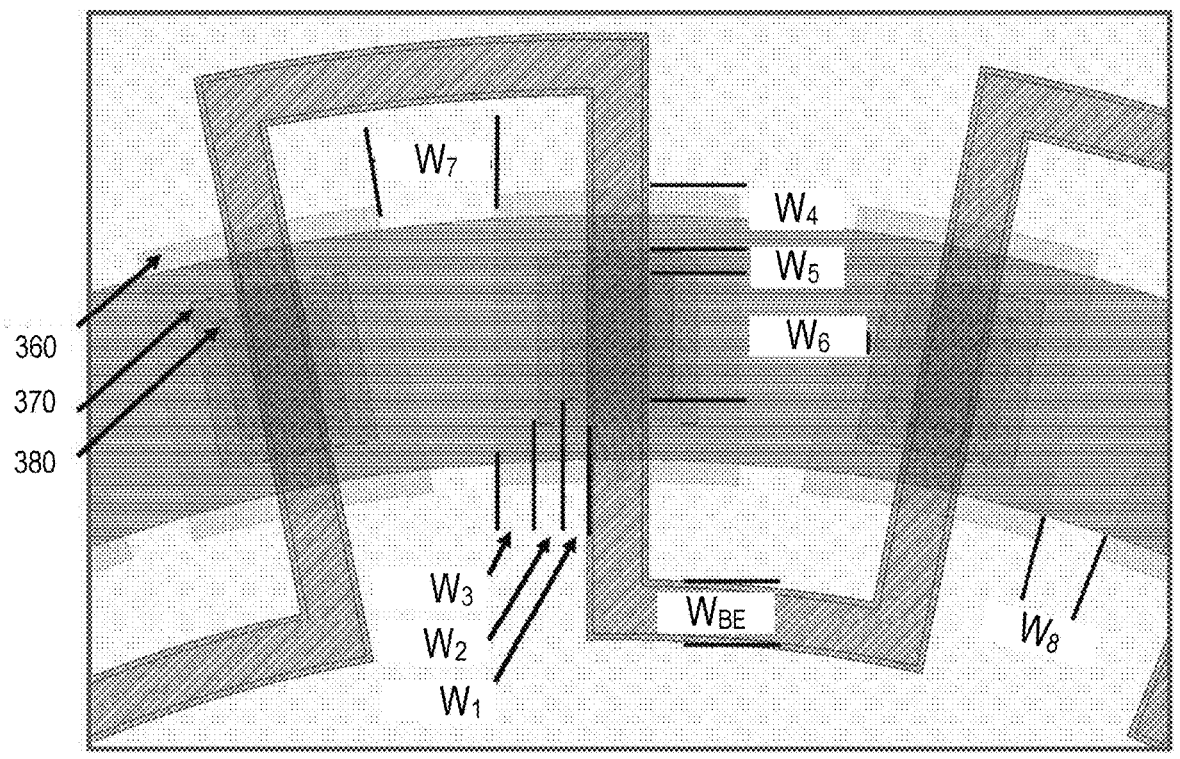
FIG. 3D illustrates a more detailed view of the added layers shown in FIG. 3C in accordance with embodiments described herein.

FIGS. 3A and 3B show another example of a test structure for detecting passivation failure in accordance with embodiments described herein. A BE path 320 has a plurality of intersections 330 with a moat structure 310. In this example, the BE path 320 crosses 330 the moat structure 24 times. Therefore, the system shown in FIGS. 3A-3B provides 24 opportunities to detect BE attack due to passivation failure. This is two times the opportunity to detect BE attack than the example shown in FIGS. 2A and 2B If adequate passivation of the BE has occurred, the measured resistance of the electrode path may be in a range of about $65\Omega$ to about $95\Omega$. If the measured resistance outside of this range, it may be determined that the passivation has failed at one or more of the moat crossings 330. In some cases, if the calculated resistance of the electrode path is more than a predetermined threshold beyond an estimated resistance (e.g., $80\Omega$), it may be determined that the passivation has failed. DC probe pads 350, 355 may be used to enable both RF and DC probing FIG. 3C shows the moat with added layers at the moat crossings to simulate the moat changes at the crossings. A more detailed view of the added layers at location 350 of FIG. 3C is shown in FIG. 3D. In this example, the additional layers include a under-bump (UB) metal layer 360, a top electrode layer (TE) 370, and a passivation (PA) layer 380. According to various embodiments, the UB metal layer comprises Au. In some cases, the PA layer comprises SiN. Various dimensions ($W_1$, $W_2$, $W_3$, $W_4$, $W_5$, $W_6$, $W_7$, $W_8$) of the different layers and between the different layers are shown. $W_1$ may be in a range of about 1 μm to about 3 μm. In some cases, $W_1$ is about 2 μm. $W_2$ may be in a range of about 1 μm to about 3 μm. In some cases, $W_2$ is about 2 μm. $W_3$ may be in a range of about 2 μm to about 4 μm. In some cases, $W_3$ is about 3 μm. $W_4$ may be in a range of about 3 μm to about 7 μm. In some cases, $W_4$ is about 5 μm. $W_5$ may be in a range of about 1 μm to about 3 μm. In some cases, $W_5$ is about 2 μm. $W_6$ may be in a range of about 7 μm to about 13 μm. In some cases, $W_6$ is about 10 μm. $W_7$ may be in a range of about 7 μm to about 13 μm. In some cases, $W_7$ is about 10 μm. $W_8$ may be in a range of about 3 μm to about 7 μm. In some cases, $W_8$ is about 5 μm. A width of the BE path, $W_{BE}$, may be in a range of about 4 μm to about 8 μm. In some cases, $W_{BE}$ is about 6 μm. $W_{BE}$ may be substantially constant throughout the BE path as shown in the examples of FIGS. 3A-3D. In some cases, $W_{BE}$ may vary depending on a location of the BE path.

7                                                                                    8

Figure 4A:
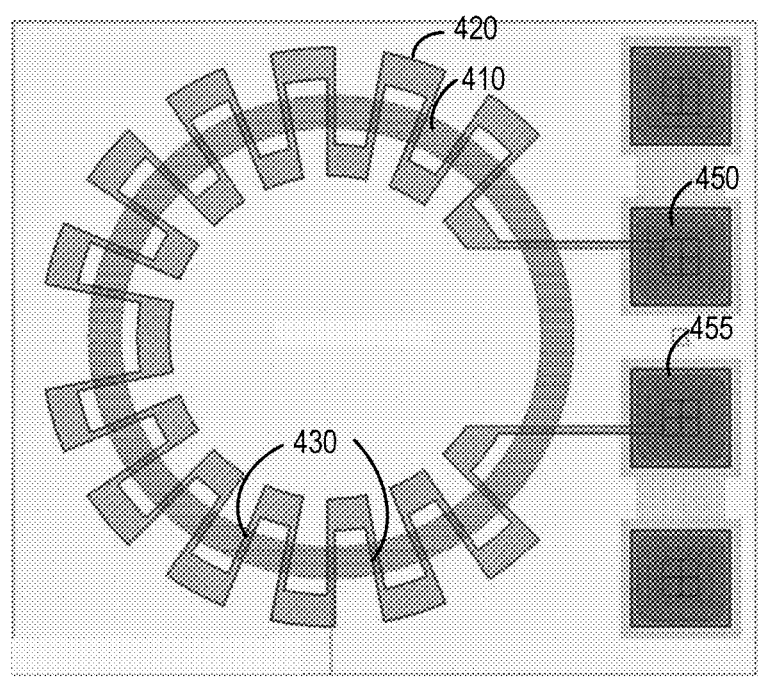
FIGS. 4A and 4B show another example of a test structure for detecting passivation failure in accordance with embodiments described herein.
Figure 4B:
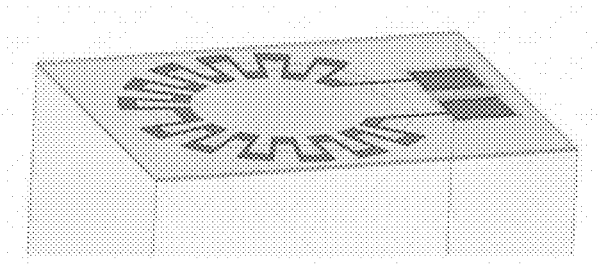
Figure 5:
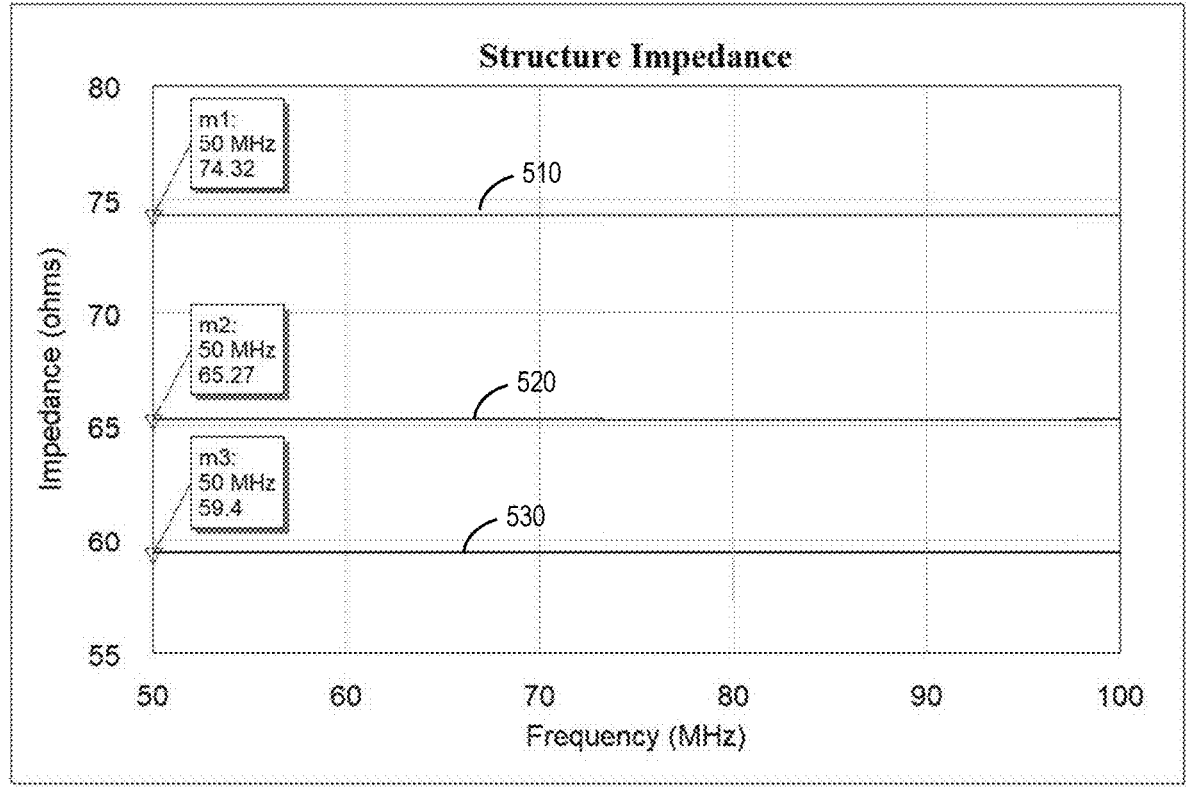
FIG. 5 shows the test structure impedance results for the structure of FIG. 2A, FIG. 3A, and FIG. 4A 530 in accordance with embodiments described herein.

FIGS. 4A and 4B show another example of a test structure for detecting passivation failure in accordance with embodiments described herein. A BE path 420 has a plurality of intersections 430 with a moat structure 410. Similarly to FIGS. 3A-3D, the BE path 420 crosses 430 the moat structure 24 times. Therefore, the system shown in FIGS. 4A-4B provides 24 opportunities to detect BE attack due to passivation failure. If adequate passivation of the BE has occurred, the measured resistance of the electrode path may be in a range of about 35Ω to about 65Ω. If the measured resistance outside of this range, it may be determined that the passivation has failed at one or more of the moat crossings 430. In some cases, if the calculated resistance of the electrode path is more than a predetermined threshold beyond an estimated resistance (e.g., 50Ω), it may be determined that the passivation has failed. DC probe pads 450, 455 may be used to enable both RF and DC probing FIG. 5 shows the test structure impedance results for the structure of FIG. 2A 510, FIG. 3A 520, and FIG. 4A 530 in accordance with embodiments described herein.

Figure 6:
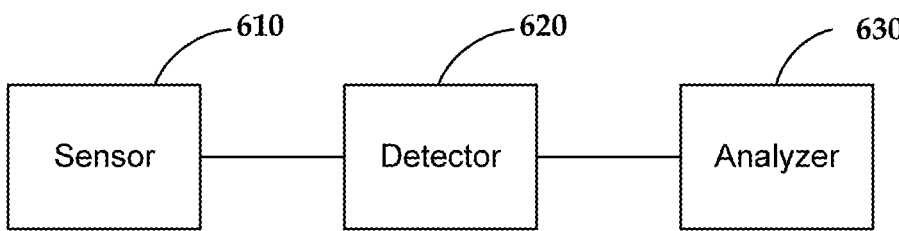
FIG. 6 illustrates a system capable of determining passivation failure in accordance with embodiments described herein.

FIG. 6 illustrates a system capable of determining passivation failure in accordance with embodiments described herein. A sensor 610 is coupled to a sensor test structure. The sensor test structure includes a detector 620 configured to detect the change in resistance of the electrode path. An analyzer 630 may be configured to determine passivation failure of the moat structure based on the detected change in resistance. In some cases, the analyzer is configured to determine if the sensed resistance is in a predetermined threshold range (e.g., about 35Ω to about 95Ω). According to various embodiments, if it is determined that the sensed resistance is outside of the predetermined threshold range, the analyzer is configured to determine that passivation failure has occurred.

Illustrative embodiments are described and reference has been made to possible variations of the same. These and other variations, combinations, and modifications will be apparent to those skilled in the art, and it should be understood that the claims are not limited to the illustrative embodiments set forth herein.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open-ended sense, and generally mean "including, but not limited to." It will be understood that "consisting essentially of," "consisting of," and the like are subsumed in "comprising" and the like. As used herein, "consisting essentially of," as it relates to a composition, product, method or the like, means that the components of the composition, product, method or the like are limited to the enumerated components and any other components that do not materially affect the basic and novel characteristic(s) of the composition, product, method or the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Any direction referred to herein, such as "top," "bottom," "left," "right," "upper," "lower," and other directions and orientations are described herein for clarity in reference to the figures and are not to be limiting of an actual device or system or use of the device or system. Devices or systems as described herein may be used in a number of directions and orientations.

What is claimed is:

1. A test structure for a sensor, comprising:
a substrate being part of the sensor, the sensor comprising a resonating structure comprising a piezoelectric layer having an active region, the sensor further comprising a passivation layer overlaying the resonating structure including the active region;
a moat structure disposed on the substrate and configured to at least partially surround the active region of the resonating structure in plan view;
an electrode disposed on the substrate and comprising an electrode path configured to cross the moat structure a plurality of times along a majority of the moat structure in plan view, wherein the moat structure at each moat crossing is configured to cause a change in electrical resistance of the electrode if there is passivation failure of the passivation layer at the moat crossing;
a detector configured to detect the change in electrical resistance of the electrode; and
an analyzer configured to determine passivation failure of the passivation layer based on the detected change in electrical resistance.

2. The test structure of claim 1, wherein the change is resistance comprises an increase in resistance.

3. The test structure of claim 1, wherein the moat structure is substantially a circular structure.

4. The test structure of claim 1, wherein the electrode path is configured to cross the moat structure in a range of about 10 times to about 30 times.

5. The test structure of claim 1, wherein the electrode path is configured to cross the moat structure about 12 times.

6. The test structure of claim 1, wherein the electrode path is configured to cross the moat structure about 24 times.

7. The test structure of claim 1, further comprising an analyzer configured to determine if the change in resistance is in a predetermined threshold range.

8. The test structure of claim 7, wherein the predetermined threshold range is about 35Ω to about 95Ω.

9. The test structure of claim 8, wherein the predetermined threshold range is about 50Ω to about 80Ω.

10. The test structure of claim 7, wherein if it is determined that the change in resistance is outside of the predetermined threshold range, the analyzer is configured to determine that passivation failure has occurred.

11. A system, comprising:

a sensor comprising:

a substrate;

a resonating structure disposed proximate the substrate and comprising at least one piezoelectric layer, the resonating structure having an active region and a passivation layer overlying the resonating structure including the active region;

a moat structure at least partially surrounding the active region of the resonating structure in plan view;

an electrode comprising an electrode path configured to cross the moat structure a plurality of times along a majority of the moat structure in plan view, wherein the moat structure at each moat crossing is configured to cause a change in electrical resistance of the electrode if there is passivation failure of the passivation layer at the moat crossing;

a detector configured to detect the change in electrical resistance; and an analyzer configured to determine passivation failure of the passivation layer based on the change in electrical resistance.

12. The system of claim 11, wherein the change is resistance comprises an increase in resistance.

13. The system of claim 11, wherein the moat structure is substantially a circular structure.

14. The system of claim 11, wherein the electrode path is configured to cross the moat structure about 12 times.

15. The system of claim 11, wherein the electrode path is configured to cross the moat structure about 24 times.

16. The system of claim 11, wherein the analyzer is configured to determine if the detected change in resistance is in a predetermined threshold range.

17. The system of claim 16, wherein the predetermined threshold range is about 35Ω to about 95Ω.

18. The system of claim 17, wherein the predetermined threshold range is about 50Ω to about 80Ω.

\* \* \* \* \*